United States Patent [19]
Grainger

[11] 3,844,264
[45] Oct. 29, 1974

[54] ANTI-POLLUTION FUEL SYSTEM

[76] Inventor: Lewis M. D. Grainger, Rt. 1, Glen Allen, Va. 23060

[22] Filed: Nov. 9, 1972

[21] Appl. No.: 304,933

[52] U.S. Cl.............. 123/136, 123/120, 123/121, 220/85 MV
[51] Int. Cl...................... B65d 25/00, F02m 59/00
[58] Field of Search.................. 123/136, 120, 121; 220/85 MV

[56] References Cited
UNITED STATES PATENTS
3,610,220  10/1971  Yamada et al...................... 123/136
3,610,221  10/1971  Stoltman............................ 123/136

OTHER PUBLICATIONS
Chrysler Evaporation Control System, (Sarto et al.), Auto. Eng. Cong., Detroit, Mich, 1-12-16-1970, No. 700150, cover and pages 4 & 5.

Primary Examiner—Charles J. Myhre
Assistant Examiner—Ronald B. Cox
Attorney, Agent, or Firm—Elton H. Brown, Jr.

[57] ABSTRACT

An anti-pollution fuel system for use with an internal combustion engine in which the fuel system is completely sealed to prevent the escape of evaporative vapors therefrom. An expansion tank is provided in the sealed system to accept over-flow expansion of vapors and/or fuel from the fuel tank with liquid in the expansion tank being returned to the fuel tank as pressure is reduced therein. The gas tank cap is sealed to prevent the flow of expanding gases therethrough and has a one way valve to admit air as the fuel is used from the fuel tank. A magnetic valve in the fuel line between the fuel tank and the fuel pump is automatically closed except when the ignition key is in the on position whereupon it opens to permit the flow of fuel to the fuel pump.

1 Claim, 3 Drawing Figures

PATENTED OCT 29 1974  3,844,264

ANTI-POLLUTION FUEL SYSTEM

BACKGROUND OF THE INVENTION

1. Field of the Invention

The present invention relates to sealed fuel tanks to eliminate evaporative air pollution and fire hazard therefrom.

2. Summary of the Invention

The fuel tank of the present invention is sealed and provided with an expansion tank to permit excess fuel and vapors to flow thereto when heat causes pressure increases in the tank. A return line controlled by a check valve permits the liquids in the expansion tank to flow back to the main fuel tank when pressure is reduced therein. The fuel tank cap is sealed to prevent the flow of gases from the tank outwardly to the atmosphere but has a one way valve to permit air to flow inwardly as fuel is removed from the tank to thus prevent a vacuum build up in the tank. The fuel tank cap serves also as a safety relief valve to vent excess pressures before they become dangerous. A magnetically actuated valve opens when the ignition key is in on position and closes automatically when the ignition key is turned off. In modified forms of the invention the concept is applied to stationary exposed and underground tanks.

The primary object of the invention is to provide a fuel system which is sealed to prevent air pollution and fire hazard caused by evaporation of fuel from the tank.

Other objects and advantages will become apparent in the following specification when considered in the light of the attached drawings.

DESCRIPTION OF THE PREFERRED EMBODIMENT

Figure 1:
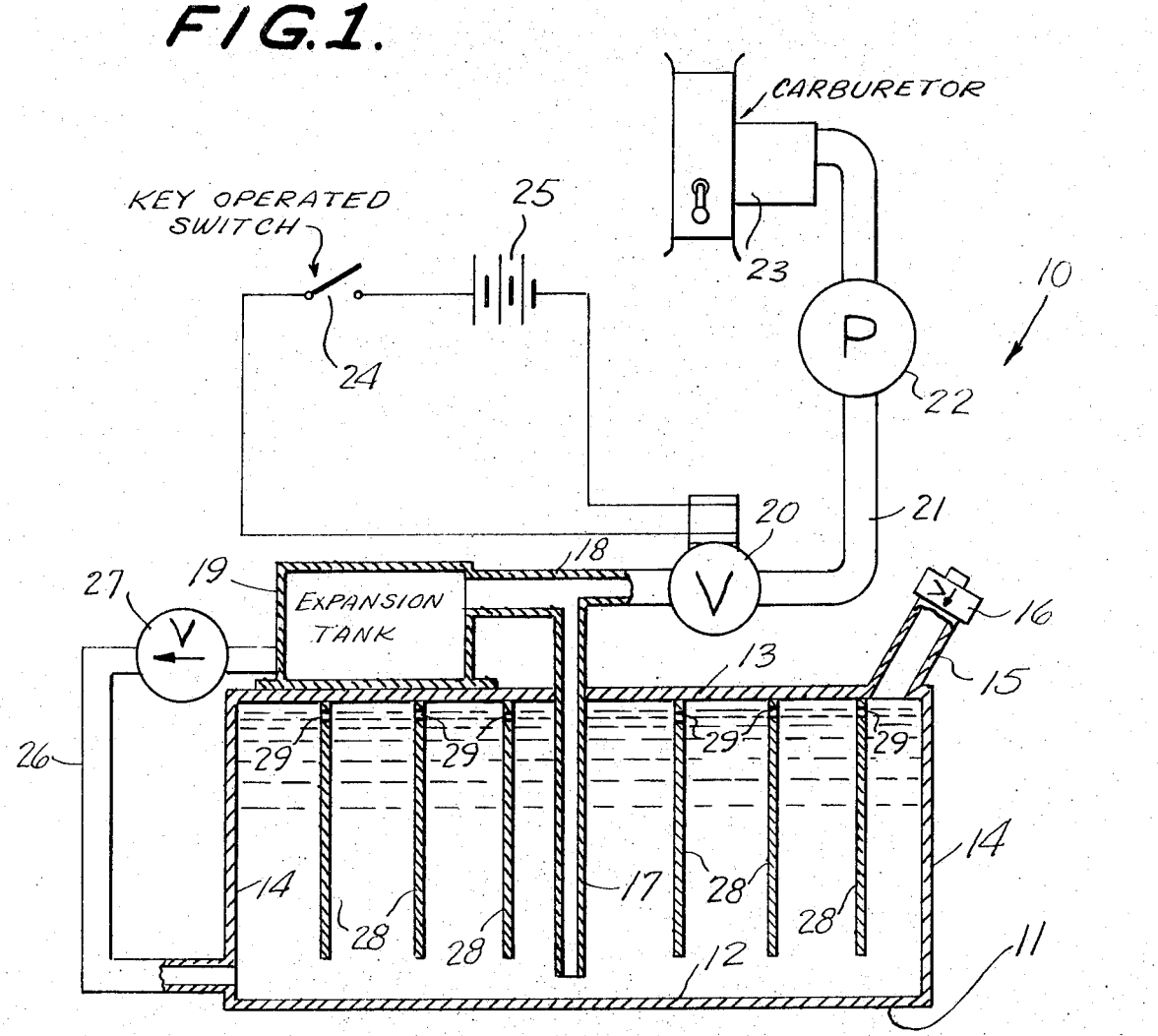
FIG. 1 illustrates a sealed engine fuel system of the instant invention shown partially broken away and in section for convenience of illustration.

Referring now to the drawings in detail, wherein like reference characters indicate like parts throughout the several figures, the reference numeral 10 indicates generally a sealed anti-pollution fuel system constructed in accordance with the invention.

The system 10 includes a fuel tank 11 having a bottom wall 12, top wall 13 and side walls 14 extending therebetween. A gooseneck filler pipe 15 is connected to the top wall 13 and is closed with a removeable cap 16 which is sealed to prevent the flow of gases upwardly through the gooseneck 15 and out to the atmosphere through the cap 16. A one way valve in the cap 16 permits the flow of air inwardly through the cap 16 to the tank 11 to relieve any vacuum occurring therein.

A fuel line 17 extends downwardly through the top wall 13 and terminates just above the bottom wall 12. The fuel line 17 is connected to the center of a tee 18 which has one side connected to an expansion tank 19 supported on the top wall 13. The other side of the tee 18 connects to a magnetic valve 20. A fuel line 21 extends from the magnetic valve 20 to the fuel pump 22 and from there to a carburetor 23. The carburetor 23 and fuel pump 22 are conventional. The ignition switch 24 of the vehicle is connected in circuit with the battery 25 to the magnetic valve 20 so as to open the valve 20 whenever the switch 24 is closed and to permit the valve 20 to close whenever the switch 24 is open.

A drain line 26 extends from the bottom of the expansion tank 19 to the bottom portion of the side wall 14 communicating with the tank 11 adjacent the bottom thereof. The drain line 26 has a one way valve 27 therein to permit the flow of fuel collected in the expansion tank 19 through the drain line 26 into the tank 11 when the pressure in the tank 11 is low enough to permit a flow into the tank 11.

The cap 16 in addition to having the one way valve structure to permit a flow of air into the tank 11 as needed will also act as a safety valve to open outwardly when the pressures in the fuel system 10 becomes so great as to completely fill the expansion tank and become dangerously high.

In the use and operation of the invention the cap 16 is removed and the tank 11 is filled conventionally with gasoline or other liquid fuel. The switch 24 is closed opening the valve 20 and as the engine is started the fuel pump 22 pumps fuel from the tank 11 to the carburetor 23. In the event that the fuel tank 11 is subjected to heat sufficient to build the pressure in the tank 11 liquid fuel will flow through the fuel pipe 17 and the tee 18 into the expansion tank 19. Should the capacity of the expansion tank 19 be insufficient to relieve the pressure on the tank 11 and the pressure continues to build to a dangerous point the cap 16 will release as a safety valve to vent the tank 11 when dangerous conditions occur. Thus the combination valve in the filler cap 16 serves two purposes, first to let in air to prevent a vacuum build up as fuel is used and secondarly to vent dangerous pressures from the tank.

The expansion tank 19 is large enough so that normal variances in ambient temperature with resulting increases in pressure will be contained therein. When the pressures in the tank 11 fall as fuel is used by the engine liquid in the expansion tank 19 will flow through the check valve 27 and line 26 to the bottom of the tank 11 and will be available for use. The tank 14 is provided with a plurality of baffles 28 to reduce splashing and evaporation resulting therefrom. The baffles 28 have a plurality of bores 29 to balance the pressures on opposite sides of the baffles 28.

In normal fuel tank systems as fuel vaporizes under heat pressure it escapes through the vented fuel tank cap and becomes an air pollutant in the atmosphere. With the present invention all vapors are contained within the system and are used as fuel so as to prevent pollution of the atmosphere and substantially to provide greater economy in fuel use.

Figure 2:
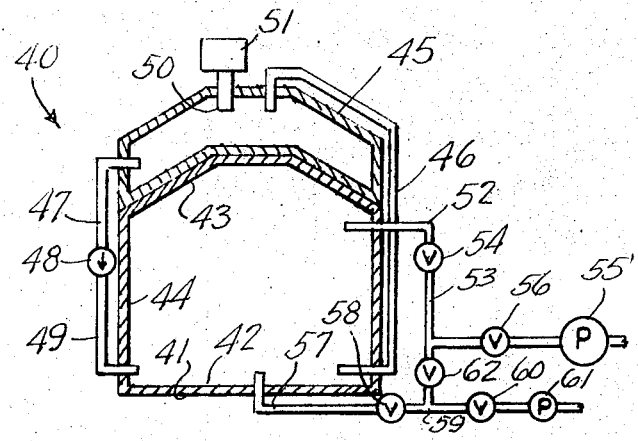
FIG. 2 is a view similar to FIG. 1 of a modified for of the invention applied to an exposed stationary tank.
Figure 3:
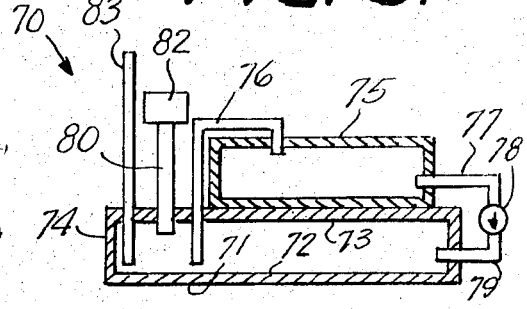
FIG. 3 is a view similar to FIG. 1 of another modified form of the invention applied to an underground tank.

Referring now to FIG. 2 the reference numeral 40 indicates generally a sealed anti-pollution, anti-fire hazard fuel system constructed in accordance with a modified form of the invention.

The system 40 includes a fuel tank 41 having a bottom wall 42, top wall 43 and side walls 44 extending therebetween. An expansion tank 45 is supported on the top wall 43 of the tank 41 and is secured thereto. A pipe 46 extends from a point adjacent the bottom of the tank 41 to a point adjacent the top of the expansion tank 45 to permit excess fluids in the tank 41 to be moved to the expansion tank 45. A drain line 47 extends downwardly from the side of the expansion tank 45 to a check valve 48 which is in turn connected by a pipe 49 to the tank 41 adjacent the bottom 42 thereof.

A vent pipe 50 extends upwardly through the top of the expansion tank 45 and has a cap 51 on its upper end which admits air into the expansion tank 45 to prevent a vacuum forming therein and will open to vent the tank 45 to the atmosphere when pressures become so high within the expansion tank 45 to be dangerous to safety.

A fuel supply pipe 52 is linked to a pipe 53 through a control valve 54 with the pipe 53 being linked to a fuel pump 55 through a control valve 56. A fuel outlet pipe 57 extends from the bottom of the tank 41 and is controlled by a valve 58. A pipe 59 couples the valve 58 to a control valve 60 leading to a fuel outlet pump 61. A valve 62 couples the pipe 59 to the pipe 53 so that the fuel inlet and outlet systems maybe interchangeably used as desired.

In the use and operation of the invention the tank 41 is filled by operating the pump 55 and opening the valves 56, 54. If the pressure in the tank 41 becomes excessive a portion of the fuel will flow upwardly through the pipe 46 into the expansion tank 45. As the pressure in the fuel tank 41 is reduced by the pumping off of fuel through the fuel outlet pipe 57 the check valve 48 will permit the fluid in the expansion tank 45 to flow downwardly into the bottom of the fuel tank 41 to thus be available for use. In the event that a vacuum is created in the expansion tank 45 air is permitted to enter through the cap 51 and vent pipe 50 and if the pressure becomes exceedingly dangerous in the expansion tank 45 such dangerous pressures will be vented to the atmosphere through the cap 51.

Another modified fuel system is indicated generally at 70. The fuel system 70 includes a tank 71 having a bottom wall 72, top wall 73 and side wall 74 extending between and connecting the top wall 73 with the bottom wall 72. An expansion tank 75 is mounted on the top wall 73 of the fuel tank 71 and has an expansion pipe 76 extending from a point adjacent the bottom wall 72 of the tank 71 to the top wall of the tank 75 to permit excess fuel in the tank 71 to flow upwardly into the expansion tank 75. A drain pipe 77 extends from the expansion tank 75 down through a check valve 78 to a pipe 79 which leads into the bottom of the tank 71. A filler pipe 80 communicates with the upper portion of the tank 71 and has its upper end closed by a cap 82. The cap 82 is adapted to admit air to the tank 71 to prevent the formation of a vacuum therein and to release excess pressure forming in the tank 71 to the atmosphere when such pressures become dangerously high.

A pipe 83 extends from a point adjacent the bottom of the tank 71 to provide an outlet for fuel from the tank 71.

In the use and operation of the system 70 the cap 82 is removed and the tank 71 is filled by pumping fuel in through the filler pipe 80. When the pressure of the fuel in the tank 71 exceeds a predetermined amount it will flow upwardly through the pipe 76 into the expansion tank 75. As fuel is used from the tank 71 fuel in the expansion tank 75 will flow downwardly through the drain line 77, check valve 78 and pipe 79 to return to the tank 71 for use. In the event that pressure in the tank 71 becomes dangerously high the cap 82 will vent the pressures to the atmosphere.

Having thus described the preferred embodiments of the invention it should be understood that numerous structural modifications and adaptations may be resorted to without departing from the spirit of the invention.

What is claimed is:

1. In a normally sealed anti-pollution fuel supply system for a vehicle including an ignition switch and a battery, a fuel tank having a bottom wall, top wall, and side walls extending therebetween, a gooseneck filler pipe connected to said top wall and closed with a removeable cap that is sealed to prevent the flow of gases upwardly through the gooseneck and out to the atmosphere through the cap, a one-way valve positioned in said cap permitting the flow of air inwardly through the cap to the tank to relieve any vacuum occurring therein, a fuel line extending downwardly through the top wall and terminating at a point just above the bottom wall, said fuel line being connected to the center of a tee, an expansion tank supported on the top wall and connected to one side of said tee, a magnetic valve being connected to the other side of the tee, a fuel pump and a carburetor, a fuel line connecting the fuel pump and carburetor to the magnetic valve, the ignition switch of the vehicle being connected in circuit with the battery to the magnetic valve so as to open the magnetic valve whenever the switch is closed and to permit the valve to close whenever the switch is open, a drain line extending from the bottom of the expansion tank to the bottom portion of a side wall of the fuel tank and communicating with the tank adjacent the bottom thereof, said drain line having a one-way valve therein to permit the flow of fuel collected in the expansion tank through the drain line into the tank when the pressure in the tank is low enough to permit a flow into the tank, said cap in addition to permitting a flow of air into the tank as needed, also acting as a safety valve to open outwardly when the pressures in the fuel system become so great as to completely fill the expansion tank.

* * * * *